US012742502B2

(12) United States Patent
Madariaga Elgueta

(10) Patent No.: US 12,742,502 B2
(45) Date of Patent: Sep. 22, 2026

(54) KNIFE VALVE FOR ATMOSPHERIC SYSTEMS

(71) Applicant: Gabriel Eliceo Madariaga Elgueta, Antofagasta (CL)

(72) Inventor: Gabriel Eliceo Madariaga Elgueta, Antofagasta (CL)

( * ) Notice: Subject to any disclaimer, the term of this patent is extended or adjusted under 35 U.S.C. 154(b) by 0 days.

(21) Appl. No.: 18/734,617

(22) Filed: Jun. 5, 2024

(65) Prior Publication Data

US 2024/0410471 A1 Dec. 12, 2024

(51) Int. Cl.
*F16K 3/02* (2006.01)
*F16K 27/04* (2006.01)

(52) U.S. Cl.
CPC .......... *F16K 3/0281* (2013.01); *F16K 3/0272* (2013.01); *F16K 27/044* (2013.01)

(58) Field of Classification Search
CPC .... F16K 3/0209; F16K 3/0218; F16K 3/0245; F16K 3/0254; F16K 3/0272; F16K 3/0281; F16K 3/314; F16K 3/34; F16K 27/044; F16K 31/50; F16K 31/508; E02B 7/28; E02B 7/38; E02B 8/04
See application file for complete search history.

(56) References Cited

U.S. PATENT DOCUMENTS

2011/0220828 A1 * 9/2011 Kennedy ............... F16K 3/0218
251/328

FOREIGN PATENT DOCUMENTS

| | | | | | |
|---|---|---|---|---|---|
| CN | 203383197 U | * | 1/2014 | ........... | F16K 3/0281 |
| CN | 113217647 A | * | 8/2021 | ............... | F16K 3/30 |
| DE | 20100434 U1 | * | 4/2001 | ........... | F16K 3/0281 |
| DE | 202010016331 U1 | * | 4/2011 | ........... | F16K 3/0227 |
| EP | 3712475 A1 | * | 9/2020 | ........... | F16K 3/0281 |
| FR | 2805329 A1 | * | 8/2001 | ........... | F16K 3/0227 |
| KR | 200355906 Y1 | * | 7/2004 | ............... | E02B 7/54 |
| KR | 20220145541 A | * | 10/2022 | ............... | E02B 8/04 |

OTHER PUBLICATIONS

Machine English translation of DE-20100434-U1 (Year: 2025).*
Machine English translation of CN-113217647-A (Year: 2025).*
Machine English translation of CN-203383197-U (Year: 2025).*

(Continued)

*Primary Examiner* — Hailey K. Do
(74) *Attorney, Agent, or Firm* — FisherBroyles, LLP; Jason P. Mueller

(57) ABSTRACT

A guillotine valve for controlling the passage of fluids, such as pulps, tailings and sludge in atmospheric systems, comprising at least one cage attached to the inlet or outlet of at least one tank; at least one gate which controls the flow of the at least one fluid; at least one movement transmission means which allows the at least one gate to be moved between at least one open position and at least one closed position; at least one drive means which allows the at least one movement transmission means to be operated; at least one anti-vibration head which joins the at least one gate with the at least one movement transmission means allowing the axial movement of the at least one gate; and at least one guide means arranged in the same direction as the at least one movement transmission means which allows a tight fit between said at least one guide means and the at least one cage.

17 Claims, 5 Drawing Sheets

(56) References Cited

OTHER PUBLICATIONS

Figure 1:
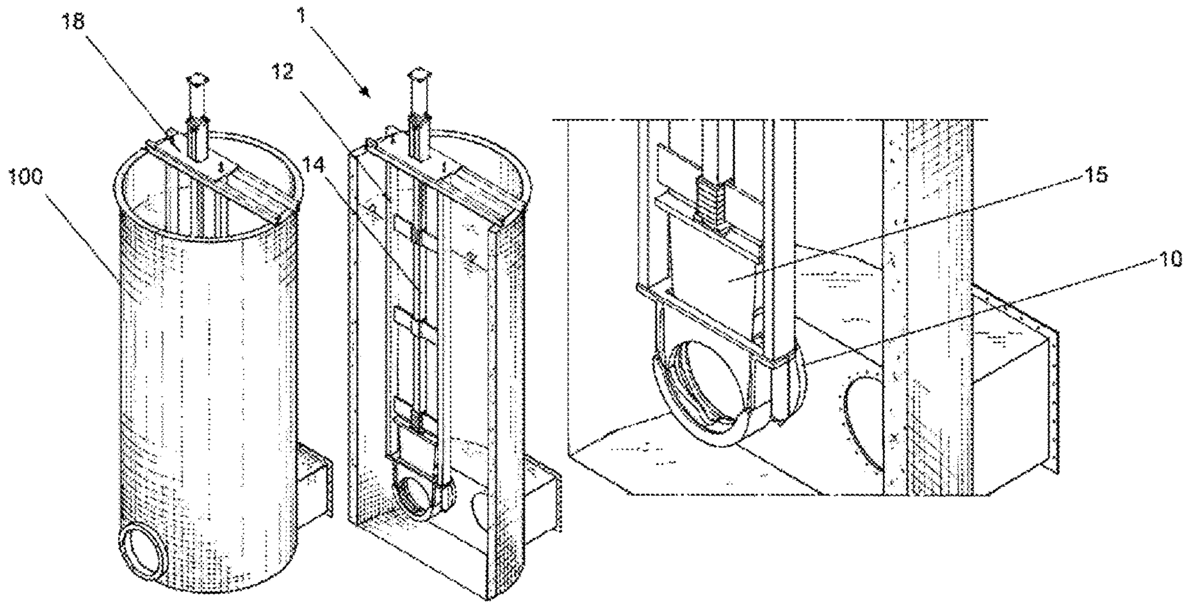

Machine English translation of DE-202010016331-U1 (Year: 2025).*
Machine English translation of EP-3712475-A1 (Year: 2025).*
Machine English translation of FR-2805329-A1 (Year: 2025).*
Machine English translation of KR-200355906-Y1 (Year: 2025).*
Machine English translation of KR-20220145541-A (Year: 2025).*

* cited by examiner

KNIFE VALVE FOR ATMOSPHERIC SYSTEMS

The present invention refers to a guillotine valve to operate in open tanks, completely submerged in the fluid, such as pulps, tailings and mineral concentrates, which allows controlling the flow rate of fluids in atmospheric systems. The guillotine valve essentially comprises at least one cage attached to the inlet or outlet of at least one tank: at least one gate which controls the flow of the at least one fluid; at least one movement transmission means which allows the at least one gate to be mobilized between at least one open position and at least one closed position; at least one drive means, which allows the at least one movement transmission means to be operated; at least one anti-vibration head which joins the at least one gate with the at least one movement transmission means allowing the axial movement of the at least one gate; and at least one guide means arranged in the same direction as the at least one movement transmission means which allows a tight fit between said at least one guide means and the at least one cage, thus configuring a smaller valve taking up less space for installation and allowing maintenance operations to be carried out online, and can be assembled and removed during operation without having to stop the process.

Additionally, the invention describes a procedure for assembling and disassembling the guillotine valve which includes the steps of mobilizing at least one valve body above the duct or installation space in at least one tank: lowering or raising the valve above the at least one tank depending on whether it is an assembly or disassembly operation; and contacting or separating at least one valve guide means with at least one bore arranged in at least one valve cage, as the valve body descends or ascends the duct.

The technology solves several issues of the current technique which become evident when evaluating the existing solutions and the specific characteristics of the invention in the following sections of this document.

BACKGROUND

In the process industry, specifically in the mining industry, there is a need to optimize the operation of each of the processes carried out, in order to maintain continuous operation, without stoppages. This has translated into the manufacture of increasingly durable machinery and components, thus minimizing downtime in operations due to maintenance or repair events. However, it is still necessary to carry out maintenance operations to check the correct functioning of the machinery and components in mining processes, which inevitably suffer wear either due to abrasion produced by the fluids transported, or due to other types of incidents, such as collisions.

Currently, in the industry there are solutions that provide additional protection to the components of dart or guillotine valves such as rubber coatings and/or hermetic seals which minimize the abrasion of the components reducing the number of maintenances that must be performed. However, in the event that the valve suffers a malfunction it will still be necessary to stop the operation of the work to dismantle the valve with the high costs that this implies in the mining industry.

Therefore, it is still necessary to have a valve that allows repair and/or maintenance operations to be carried out without affecting the normal operation of the plant or process where said valve is located.

The present invention deals with these and other problems wherein its main advantages will be detailed below along with other aspects of the technology.

Technology Description

The present technology refers to a guillotine valve to operate in open tanks, completely submerged in the fluid, such as pulps, tailings and mineral concentrates which allows controlling the flow rate of fluids in atmospheric systems, which includes:

- at least one cage attached to the inlet or outlet of at least one tank;
- at least one gate which controls the flow of the at least one fluid;
- at least one movement transmission means which allows the at least one gate to be mobilized between at least one open position and at least one closed position;
- at least one drive means which allows the at least one movement transmission means to be operated;
- at least one anti-vibration head which joins the at least one gate with the at least one movement transmission means allowing axial movement of the at least one gate; and
- at least one guide means arranged in the same direction as the at least one movement transmission means which allows a tight fit between said at least one guide means and the at least one cage.

Through the characteristics of the invention, it is possible to obtain a smaller and more compact valve than the valves commonly used in mining operations, such as flotation cells, wherein the fluid control is generally carried out through dart valves which need more space to arrange the seat. Furthermore, by having the valve in a cage attached to the inside of the tank walls, it allows the disassembly of its main elements to carry out repair and/or maintenance tasks.

The guillotine valve cage is fixed or removable attached to the body inside the tank through which the fluid to be controlled circulates. Preferably, the cage is bolted against the internal surface of the tank and may be located at the inlet or outlet of the tank.

Essentially, the cage is an element that does not require replacement, since it is not subject to wear, its sole function being to receive the rest of the valve body, thus forming a single body completing the arrangement of the guillotine valve of the invention. Preferably, the cage is manufactured from steel coated with a polymer, such as rubber or another type of rubber.

The assembly process between the cage and the rest of the valve body can be carried out through different means, such as for example, a crane bridge, which moves the valve over the duct or installation space to start lowering or raising it later. During this process, the plant can continue with its normal operation since the introduction of the valve does not affect the flow of the fluid. As the valve body continues to descend the duct, the valve guide means will contact at least one hole provided in the cage causing the desired adjustment.

The guide means corresponds to an idler, preferably two idlers arranged vertically on the sides of the movement transmission means. These idlers have a conical shape with a smaller diameter at their lower end increasing progressively until their upper end. This feature allows a tight fit between the cage and the valve body as the rollers move into the holes of the cage.

Preferably, the cage comprises a lattice inside to provide greater tightness when joining with the valve body.

According to another embodiment of the invention, the movement transmission means has a polygonal cross section preferably square.

According to another embodiment of the invention, the gate, the guide means, the movement transmission means and/or the anti-vibration head are covered in part or entirely in rubber or another type of rubber, in order to avoid abrasion.

Additionally, the valve may comprise at least one transverse guide, preferably at least three transverse guides arranged transversely to the guide means, specifically between the idlers that make up the guide means and passing through the movement transmission means, in order to prevent it to rotate or move due to the flow of the fluid helping to open and close the gate in its pathlength, in addition to avoiding the clogging of fluid particles that prevent the correct movement of the movement transmission means. Said transverse guides can be made of steel.

Finally, the valve preferably comprises an adjustment means arranged above the movement transmission means which makes minor displacements in the guide means, specifically in each of the idlers that make up the guide means to complete a full tight fit with the cage.

PREFERRED EMBODIMENTS

Below, various figures of the guillotine valve are exhibited according to one of its preferred embodiments.

FIG. 1 shows a general view of the guillotine valve (1) arranged inside a tank (100), as well as a section view that allows viewing the valve body (11) arranged in the cage (10) which is bolted against the surface of said tank.

As mentioned above, the valve body (11) is introduced through the duct or space provided for its operation sliding it vertically until the guide means (12) or idlers located on the sides of the valve body (11) are introduced into the respective holes (10*a*) of the cage. This configures an open body valve which allows its main components grouped in the valve body (11), to be disassembled for repair and/or maintenance tasks without affecting the normal operation of the plant.

Furthermore, it is observed the arrangement of an upper base (18) to which the upper ends of the guiding means (12), made up of the idlers and the movement transmission means (14), are attached. Said upper base may be arranged on a support means arranged from side to side in the tank duct.

This FIG. 1 also shows the arrangement of the transverse guides (13) that provide stability to the movement transmission means (14) arranged in the central part of the valve body (11), thus helping in the path to open and close the gate (15). In relation to the movement transmission means (14), this may correspond to any means that transfers movement hydraulically, mechanically and/or electrically, such as a piston.

Figure 2:
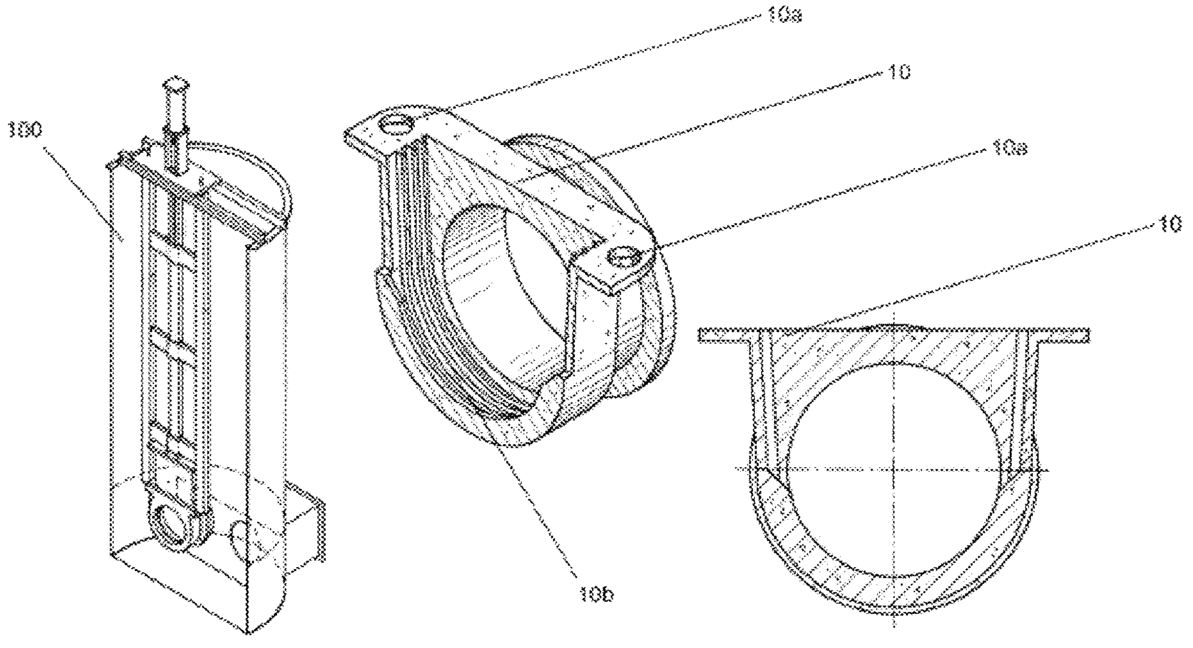

FIG. 2 shows in detail the shape of the cage (10) where the two holes (10*a*) can be seen for coupling with the idlers that make up the guide means (12). In addition, the interior lattice (10*b*) is observed which allows full tightness to be obtained when the gate (15) is closed preventing the passage of fluid, if necessary.

Figure 3:
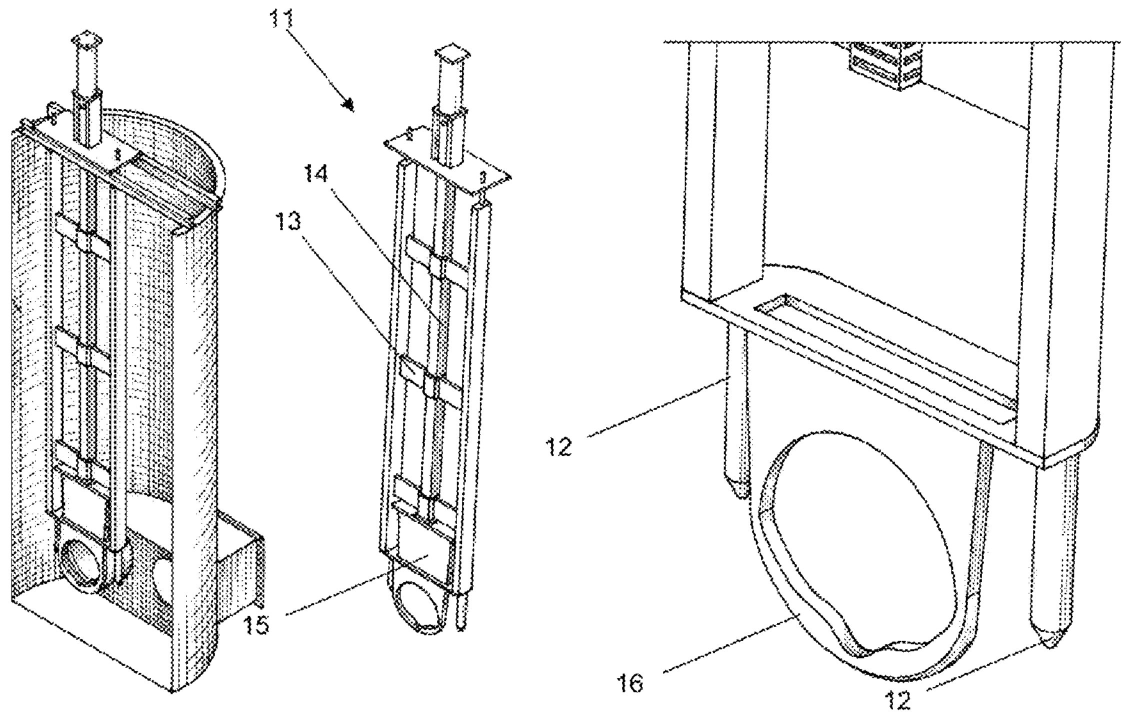

In relation to FIG. 3, it shows in detail the idlers that make up the guiding means (12), as well as a housing (16), through which the gate (15) enters to control the flow of the fluid. These components are preferably made of steel and may be covered in rubber or another type of rubber to prevent abrasion. The housing (16) is integrally attached to the guide means (12) so as to fit into the cage (10) together with the idlers of said guide means (12).

Figure 4:
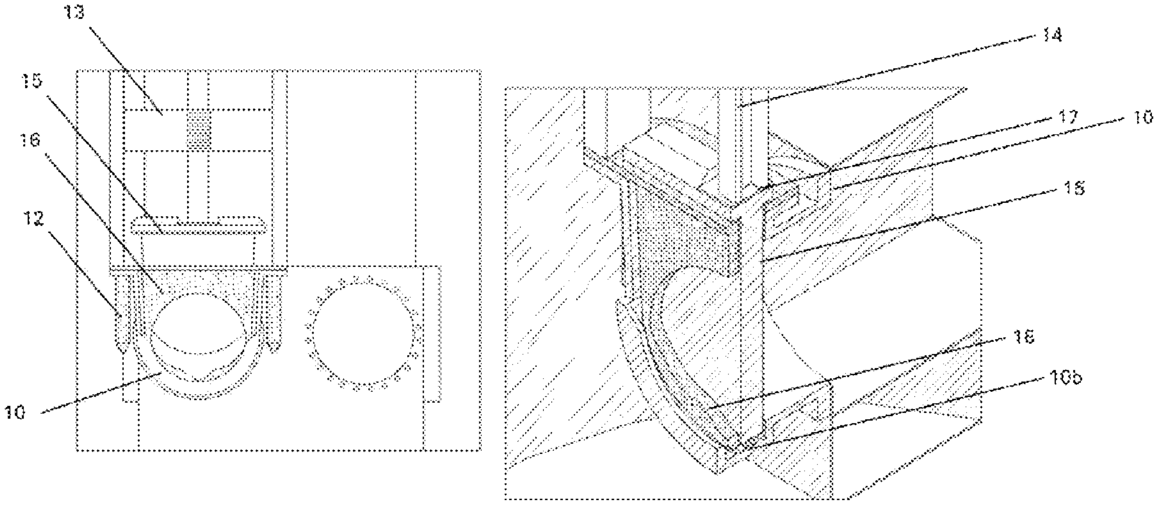

FIG. 4 shows the movement of the gate (15) as it fits into the housing (16) and subsequently into the cage lattice (10*b*). Preferably, the valve can have different geometries for its characterization, depending on the type of process and fluid to be controlled.

Also seen in FIG. 4 is the anti-vibration head (17) which absorbs the vibrations produced by the fluid when it impacts against the gate (15) which favors a longer useful life of this valve component. Furthermore, said anti-vibration head (17) which joins the gate (15) with the movement transmission means (14) allows the axial movement of the gate (15) helping it to slide without problems.

Figure 5:
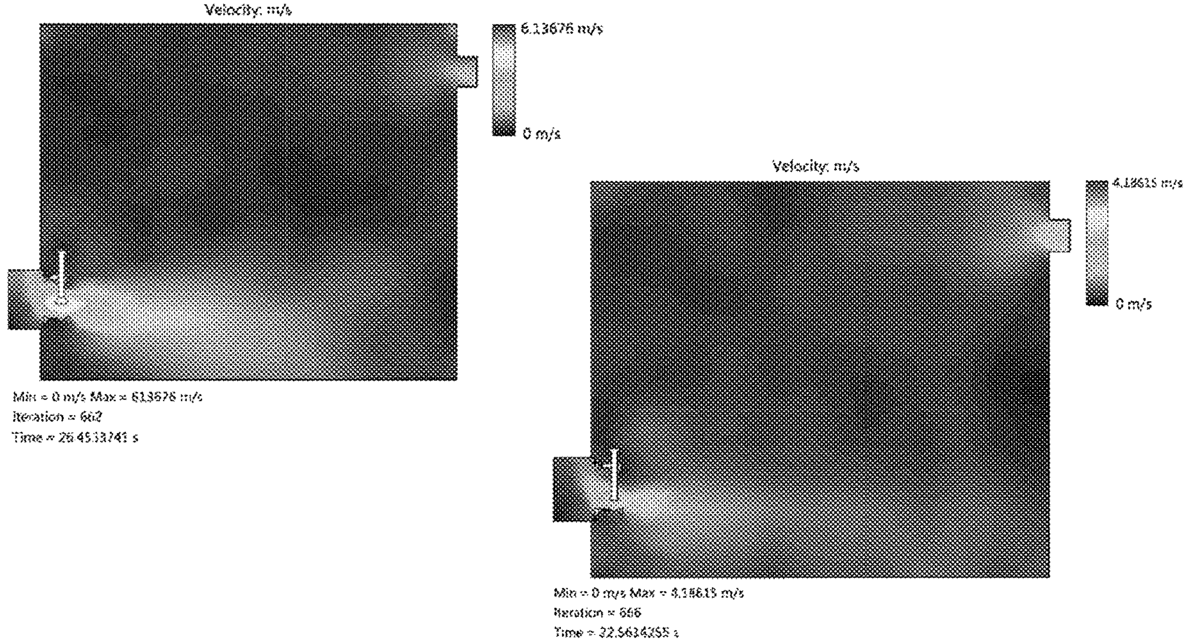

Finally, FIG. 5 shows two graphs that show the velocity profile of the fluid as it passes through the valve gate. From these graphs, it can be noted how the valve of the invention reduces fluid turbulence by obtaining an essentially horizontal velocity profile. This also helps to reduce wear within the equipment where the valve is operating.

The invention claimed is:

1. A guillotine valve to operate in open tanks, completely submerged in a fluid, which allows controlling a flow rate of fluids in atmospheric systems, wherein the guillotine valve includes:

at least one cage attached to an inlet or outlet of at least one tank;

at least one gate which controls a flow of the fluid;

at least one movement transmission means which allows the at least one gate to be moved between at least one open position and at least one closed position;

at least one anti-vibration head which joins the at least one gate with the at least one movement transmission means allowing the axial movement of the at least one gate; and at least one guide means arranged in the same direction as the at least one movement transmission means which allows a tight fit between said at least one guide means and the at least one cage, wherein the at least one guide means comprises at least two idlers, wherein the at least two idlers comprise a conical shape having a smaller diameter at its lower end, increasing progressively to its upper end.

2. The guillotine valve according to claim 1, wherein the at least one cage is fixedly attached to an interior of the at least one tank.

3. The guillotine valve according to claim 1, wherein the at least one cage is made of steel.

4. The guillotine valve according to claim 1, wherein the at least one cage is coated with a polymer.

5. The guillotine valve according to claim 1, wherein the at least one cage comprises at least one lattice inside.

6. The guillotine valve according to claim 1, wherein the at least one movement transmission means has a polygonal cross section shape.

7. The guillotine valve according to claim 1, further comprising at least one housing attached to at least one guide means and that fits into the al least one cage to receive the at least one gate.

8. The guillotine valve according to claim 1, wherein the at least one gate, the at least one guide means, the at least one movement transmission means and/or the at least one anti-vibration head are covered partly or entirely of rubber.

9. The guillotine valve according to claim 1, wherein the at least one movement transmission means has a square shape.

10. The guillotine valve according to claim 1, wherein the at least one cage is removably attached to an interior of the at least one tank.

11. The guillotine valve according to claim 10, wherein the at least one cage is bolted against an internal surface of the at least one tank.

12. The guillotine valve according to claim 1, further comprising at least one upper base to which the upper ends of the at least one guide means and the at least one movement transmission means are attached.

13. The guillotine valve according to claim 12, wherein the at least one upper base is arranged on at least one support means arranged side by side in a duct of the at least one tank.

14. The guillotine valve according to claim 1, further comprising at least one transverse guide arranged transversely between the at least one guide means.

15. The guillotine valve according to claim 14, wherein the at least one transverse guide crosses the at least one movement transmission means.

16. The guillotine valve according to claim 14, wherein the at least one transverse guide is made of steel.

17. A procedure for assembling and disassembling the guillotine valve of claim 1, wherein the procedure it includes the stages of:

moving at least one valve body above a duct in at least one tank;

lowering or raising the guillotine valve above the at least one tank, depending on whether it is an assembly or disassembly operation; and contacting or separating at least one valve guide means with at least one hole arranged in at least one valve cage, as the at least one valve body descends or ascends through the duct, wherein the at least one guide means comprises at least two idlers, wherein the at least two idlers comprise a conical shape having a smaller diameter at its lower end, increasing progressively to its upper end.

* * * * *